(12) United States Patent
Tamura

(10) Patent No.: US 6,672,080 B2
(45) Date of Patent: Jan. 6, 2004

(54) RAPID COOLING DEVICE AND METHOD OF RAPIDLY COOLING THE DEVICE

(75) Inventor: Tetsuto Tamura, Koshigaya (JP)

(73) Assignee: Masue Iwasaki, Gumma-ken (JP); part interest ( * ) Notice: Subject to any disclaimer, the term of this patent is extended or adjusted under 35 U.S.C. 154(b) by 0 days.

(21) Appl. No.: 10/257,579

(22) PCT Filed: Mar. 29, 2001

(86) PCT No.: PCT/JP01/02689

§ 371 (c)(1),
(2), (4) Date: Oct. 11, 2002

(87) PCT Pub. No.: WO01/79775

PCT Pub. Date: Oct. 25, 2001

(65) Prior Publication Data

US 2003/0106328 A1 Jun. 12, 2003

(30) Foreign Application Priority Data

Apr. 13, 2000 (JP) ......................................... 2000-112000

(51) Int. Cl.⁷ ............................ F25B 47/00; F25J 15/00; F28F 9/22; F28F 13/00
(52) U.S. Cl. ............................ 62/85; 165/145; 165/146; 110/203
(58) Field of Search ............................ 62/85; 165/144, 165/145, 146; 110/203

(56) References Cited

U.S. PATENT DOCUMENTS

| | | | | |
|---|---|---|---|---|
| 2,916,263 A | * | 12/1959 | Godshalk ..................... | 165/145 |
| 4,034,717 A | * | 7/1977 | Clum et al. .................. | 122/359 |
| 5,482,110 A | * | 1/1996 | Hartermann et al. ........... | 165/84 |
| 5,676,715 A | * | 10/1997 | Kalka et al. .................. | 96/228 |
| 5,915,310 A | * | 6/1999 | Hura et al. .................. | 110/345 |

FOREIGN PATENT DOCUMENTS

| | | | | |
|---|---|---|---|---|
| JP | 63-75488 A | * | 4/1988 | |
| JP | 5-79791 A | * | 3/1993 | |
| JP | 11-132428 A | * | 5/1999 | |

OTHER PUBLICATIONS

Microfilm of the specification and drawings annexed to the request of Japanese Utility Model Application No. 106281/1981 (Laid–open No. 15896/1983) (Ishikawajima–Harima Heavy Industries Co. Ltd.), Jan. 1983.*

Microfilm of the specification and drawings annexed to the request of Japanese Utility Model Application No. 84777/1985 (Laid–open No. 204175/1986) (Mitsubishi Heavy Industries, Ltd.), Dec. 1986.*

* cited by examiner

*Primary Examiner*—William C. Doerrler
(74) *Attorney, Agent, or Firm*—Carella Byrne Bain Gilfillan et al.; Elliot M. Olstein; William Squire

(57) ABSTRACT

A rapid cooling apparatus passing hot exhaust gas in a short time along a flow path formed in a cooling setting with piled up arrangement and having a reduced cross-sectional area of the flow path to reduce the volume thereof so as to cool rapidly to a temperature below a dioxin synthesizing temperature so that dioxins are prevented from generating, characterized in that multistage tube bodies for heat exchange to pass coolant therethrough are arranged in a rapid cooling cylindrical body for passing hot gas such as exhaust gas from an inlet opening to an outlet opening, and the cross-sectional area of the rapid cooling cylindrical body is being reduced gradually in a passing direction of the hot gas.

5 Claims, 7 Drawing Sheets

RAPID COOLING DEVICE AND METHOD OF RAPIDLY COOLING THE DEVICE

FIELD OF INVENTION

The present invention relates to a rapid cooling apparatus and its method capable of completely suppressing or preventing toxic substances discharged from, for example, various incinerators, melting furnaces and the like, from synthesizing dioxins secondarily.

RELATED ART

Cooling apparatuses employed in combustion equipment for incinerators, melting furnaces and the like are used not only in waste treatments but also widely used in industries such as metal smelting facilities, pulp bleaching processes, cement plants, glass plants, ceramic plants, plants for manufacturing chemical material or products and the like.

However, toxic dioxins are re-synthesized in cooled discharged gas from the above-mentioned facilities and plants. Consequently, the atmosphere and the global environment have been deteriorated so that it has been widely advocated that improvements on the global scale are required.

For that purpose, various kinds of rapid cooling apparatuses have been developed so as to remove dioxins, which are air pollutants and toxic.

Means to decompose dioxins by burning at high temperatures, means to prevent synthesized dioxins from generating during cooling steps of hot exhaust gas discharged to the atmosphere afterward, have been known as apparatuses or methods for removing dioxins. However these apparatuses or methods require complicated structures and cannot construct effective ones at low cost.

Organic substances and the like constituting synthetic resin such as chlorine components, hydrogen components and the like are completely reacted or decomposed into elements in the form of hot exhaust gas, when the substances are combusted in combustion equipment at temperatures higher than 800° C. In these states, toxic dioxins are decomposed into nontoxic substances, but when the exhaust gas is cooled to a dioxin re-synthesizing temperature of ca. 340° C. an inconvenient problem that dioxins are re-synthesized around this temperature, happens.

It was already proved through experiments and officially admitted by the Japanese government that hot exhaust gas should be rapidly cooled from 800° C. around which the exhaust gas is in a decomposed state, to below the dioxin re-synthesizing temperature of 340° C. within 16 thousandths second in order to prevent dioxins from re-synthesizing from decomposed hot gas at a high temperature.

The present invention is carried out in view of the above-mentioned fact in order to provide a more excellent rapid cooling apparatus and a method thereof capable of preventing dioxins from re-synthesizing by modifying or developing previous inventions (Japanese patent registered Nos. 3127249 and 3125217) invented by the present inventor.

DISCLOSURE OF THE INVENTION

The present invention relates to a rapid cooling apparatus equipped with multistage heat exchanger tubes for passing through coolant, arranged in a rapid cooling cylindrical body for passing hot exhaust gas comprising chemical component molecules consisting of decomposed dioxins generated in various furnaces, from an inlet opening to an outlet opening of the cylindrical body. A cross-sectional area of the rapid cooling cylindrical body is gradually diminished in a passing direction of the exhaust gas. The present invention also relates to a rapid cooling method for exchanging heat between the above-mentioned hot exhaust gas and the coolant when the exhaust gas is passed at a predetermined flow velocity which is kept at an initial velocity without reducing the flow velocity by reducing the cross-sectional area of the rapid cooling cylindrical body so as to keep up with reducing exhaust gas volume caused by dropping temperature of the exhaust gas and for cooling the exhaust gas down to a desired temperature.

PREFERRED EMBODIMENTS BY THE PRESENT INVENTION

Figure 1:
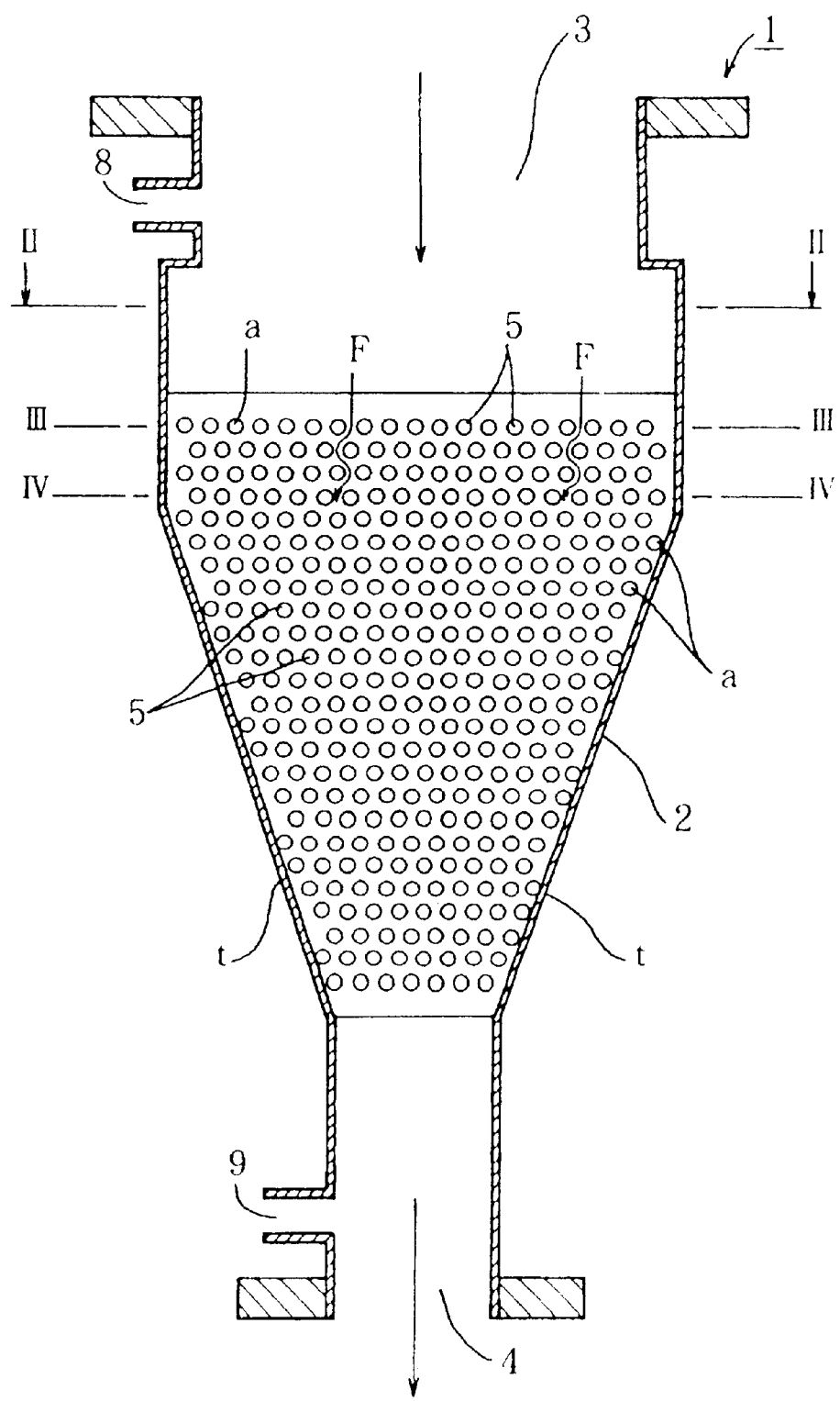
FIG. 1 is a cross-sectional view along I—I line in FIG. 2, illustrating a main arrangement of an embodiment of the rapid cooling apparatus by the present invention.

Embodiments are explained by referring to drawings for describing the present invention in detail.

In this specification, "dioxins" include poly-chlorinated dibenzo-p-dioxins (hereinafter referred as PCDDs) comprising 75 isomers/homologues and poly-chlorinated dibenzo-furans (hereinafter referred as PCDFs) comprising 135 isomers/homologues. Further poly-chlorinated biphenyl (hereinafter referred as PCBs) comprising 209 isomers/homologues include coplanar PCBs comprising 12 isomers/homologues which show similar vital reactions to those of PCDDs. Since coplanar PCBs are also synthesized in waste incinerators and widely pollute environments as PCDDs and PCDFs, coplanar PCBs are also included in and called "dioxins" altogether.

Structural formulas of these dioxins are shown below.

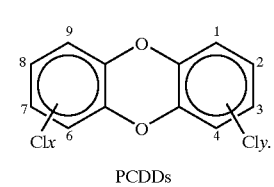

PCDDs (1)

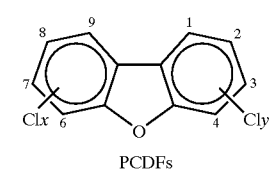

PCDFs (2)

$x + y = 1 \sim 8$

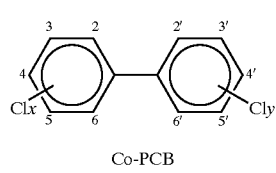

(3)

Co-PCB $x + y = 4 \sim 7$

Structural Formula of Dioxins

Hereinafter embodiments by the present invention are explained by referring to drawings.

In drawings, a reference numeral "1" is a rapid cooling apparatus having a rapid cooling cylindrical body 2, which shows a square or preferably a rectangular shape in its plan view, a long rectangular longitudinal shape in its side view and reducing its widths in its front and rear views along a direction from the top to the bottom, and as a whole shows a cubic shape with compartment arrangements. A reference numeral "3" represents an inlet opening formed on an upper side or a lower side (in the drawings it is formed on the upper side) of the rapid cooling cylindrical body 2. The inlet opening 3 introduces hot exhaust gas with a temperature of more than 800°, comprising chemical component molecules of decomposed dioxins generated in various furnaces. A reference numeral "4" represents an outlet opening formed on the lower side or the upper side (in the drawings it is formed on the lower side) of the rapid cooling cylindrical body 2 for discharging rapidly cooled exhaust gas, namely, cooled to lower than a so-called dioxin re-synthesizing temperature 300° C. for example, lower than 270° C.

In the rapid cooling cylindrical body 2, a tapered cylindrical periphery t is formed such that cross sectional area of the cylindrical body from the upper inlet opening 3 to the lower outlet opening 4 reduces gradually as shown in FIG. 1 so as to squeeze a flow rate, in other words, flow volume of the introduced hot exhaust gas.

The tapered cylindrical periphery t can form on the rapid cooling cylindrical body 2 either with a rectangular or with a circular cross section. It may be formed only on mutually facing inner surfaces. It also may be formed around the whole periphery of the rapid cooling cylindrical body 2 such that the rapid cooling cylindrical body is formed in a pyramid or a cone.

A reference numeral "5" is cooling tubes for heat exchange, having a cross section of a preferable shape such as circular, rectangular or the like. Heat resistant metals such as stainless steel, titanium, zirconium and the like, and heat resistant ceramics are employed for the cooling tubes piled one above the other such that a plurality of cooling tubes form multistage tube rows in the rapid cooling cylindrical body 2. Cooling air or cooling liquid is supplied from one opening ends of the cooling tubes to the other opening ends.

Figure 2:
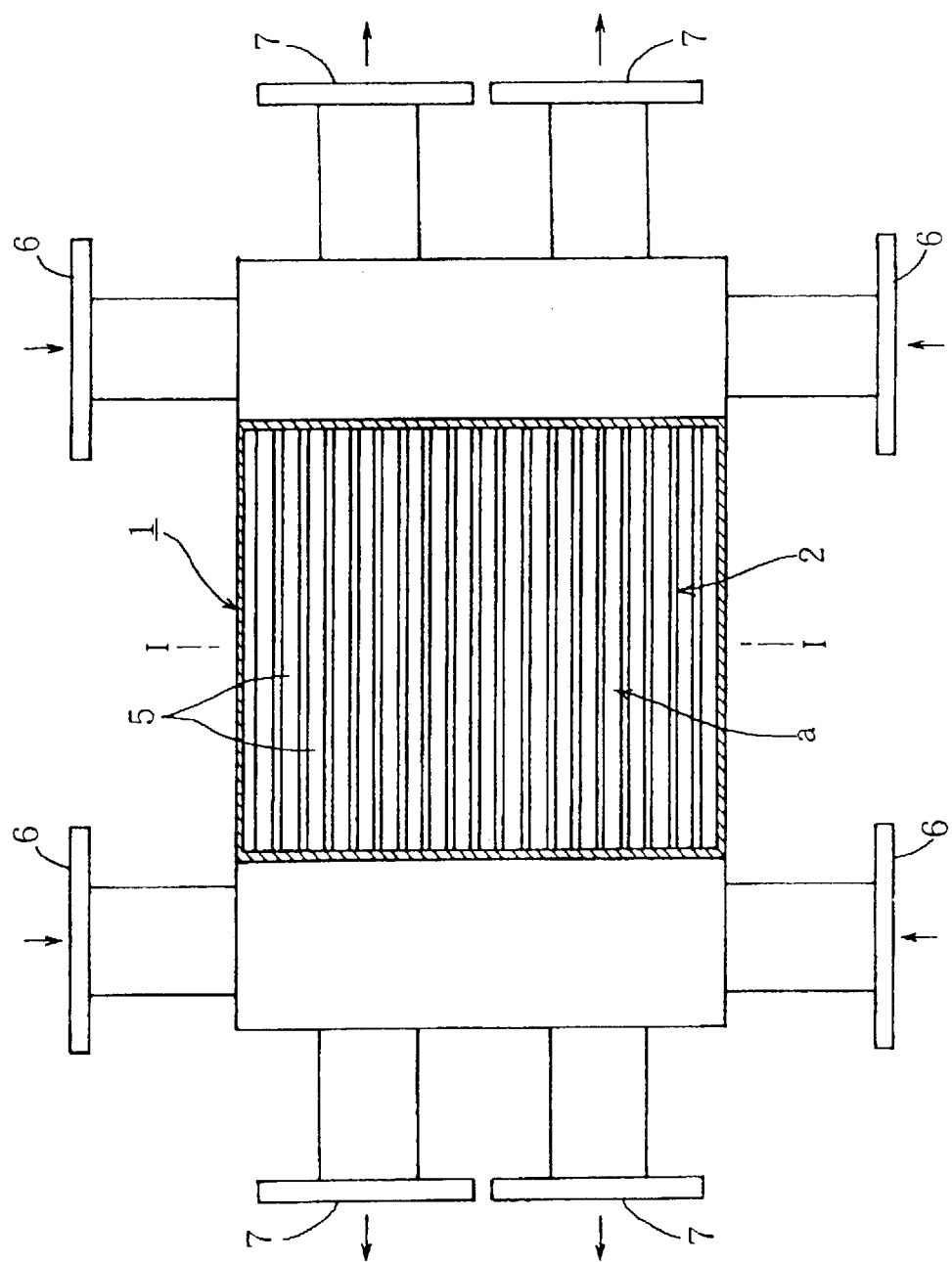
FIG. 2 is a cross-sectional view along II—II line in FIG. 1.
Figure 3:
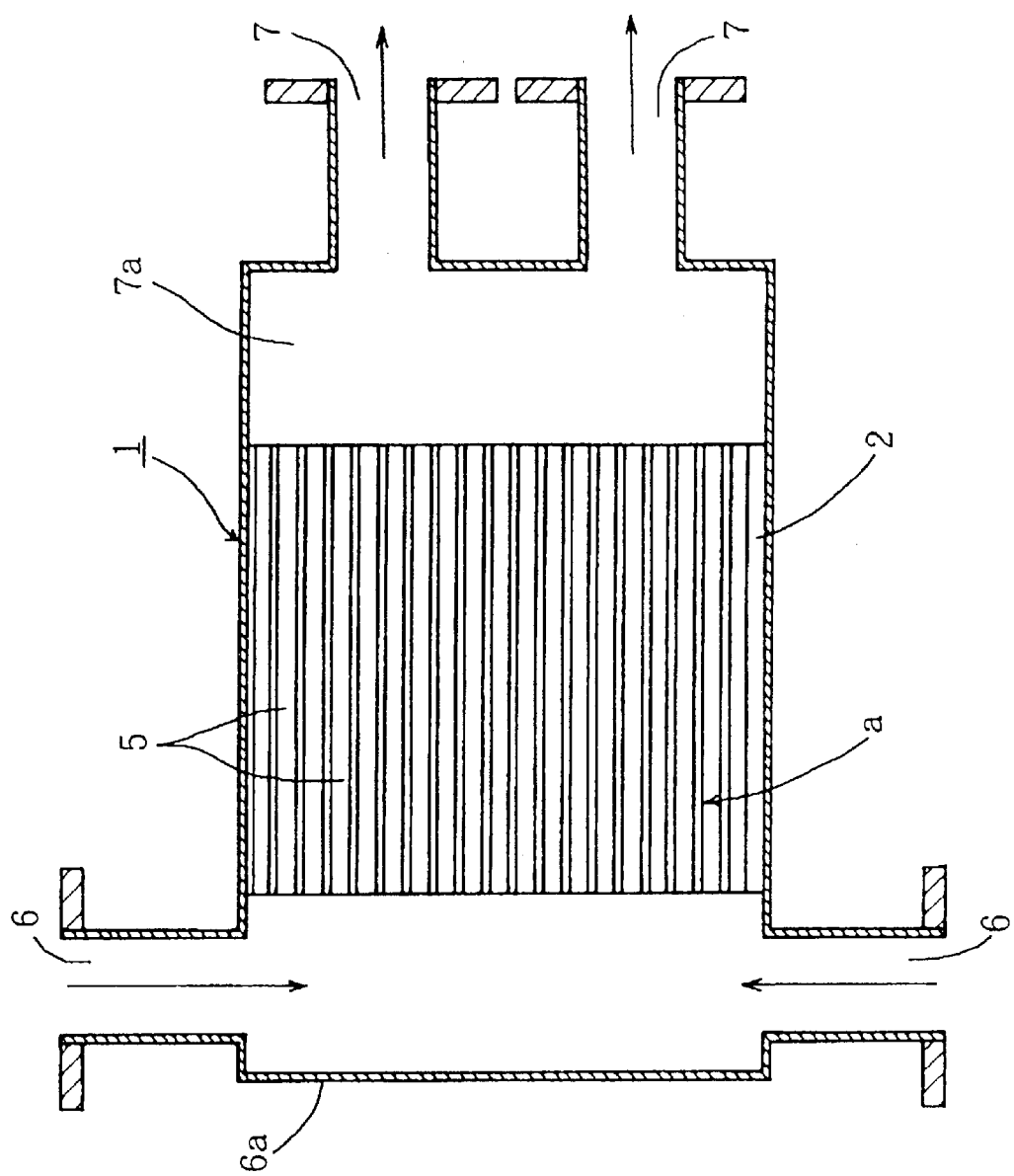
FIG. 3 is a cross-sectional view along III—III line in FIG. 1.
Figure 4:
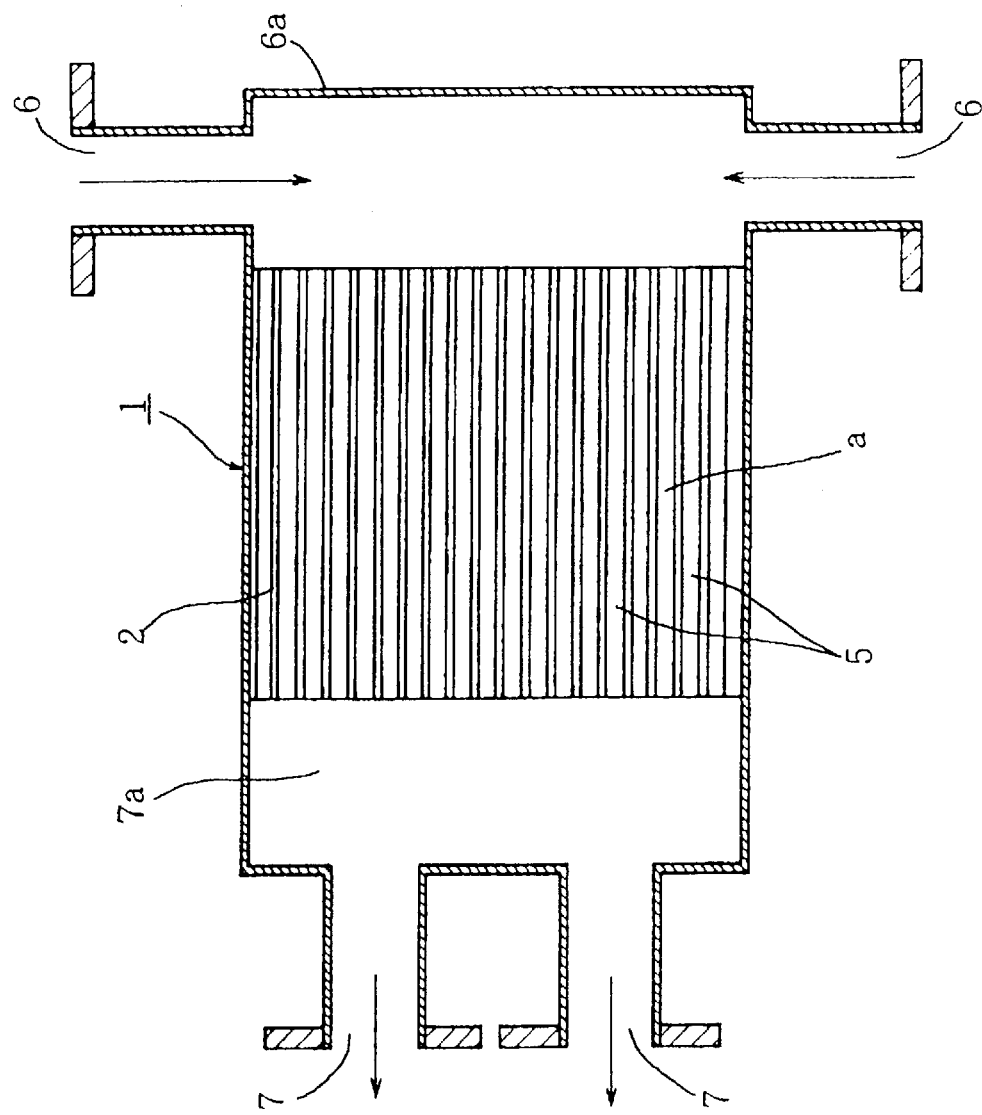
FIG. 4 is a cross-sectional view along IV—IV line in FIG. 1.

Fins (not shown in drawings) for absorbing heat are arranged at required portions of the cooling tubes 5 and the cooling tubes 5 are arrayed on the same planes spaced apart by a predetermined distance each other so as to form a planar cooling tube group "a" as shown in FIGS. 2, 3 and 4. One planar cooling tube group "a" is piled above a neighboring planar cooling tube group but is shifted a little against the neighboring planar cooling tube group such that a sectional view of planar cooling tube groups shows a checker pattern, where flow paths F are formed from upper portion to lower portion of the rapid cooling cylindrical body 2.

There or four planar cooling groups a, a, . . . spaced apart by a predetermined distance, are put together so as to form a planar tube block. Coolant inlet openings 6 and outlet openings 7 of neighboring planer tube blocks, arranged in a direction from the top to the bottom of the cylindrical body, are formed at opposite side each other as shown in FIGS. 3 and 4 so as to increase a cooling effect of the rapid cooling apparatus. The inlet openings 6 and outlet openings 7 are formed respectively at two portions of one planar tube block as shown in the drawings. And a spread room 6a and a spread room 7a are formed respectively at an inlet side and an outlet side of each planar tube block comprising planar cooling groups a, a, . . . so as to keep coolant from spreading or accumulating effectively.

Reference numerals "8" and "9" are openings for attaching measuring devices (not shown in the drawings) to measure temperature of exhaust gas at the upper and lower portions of the rapid cooling cylindrical body 2.

Hereinafter effects of the present invention are explained based on the above-mentioned arrangements.

Effects when cooling air is employed as a coolant, are explained here.

Exhaust gas discharged from various furnace having a temperature above the decomposing temperature of the dioxins, for example, over 800° C.~900° C. is introduced into the inlet opening 3 of the rapid cooling cylindrical body 2 of the rapid cooling apparatus 1 at a desired flow velocity under a desired pressure.

Cold cooling air of an ordinary temperature is introduced via right/left inlet openings 6 of each planar cooling block comprising planar cooling groups a, a, . . . and effectively exchanges heat with hot gas via walls of cooling tubes 5, and finally discharged from outlet openings 7 as warmed gas.

The hot exhaust gas is rapidly cooled at multistage planar cooling groups a, a, . . . , so that its temperature is lowered and its volume is also reduced as the hot exhaust gas is led through from the upper portion of the rapid cooling cylindrical body to the lower portion.

Since the rapid cooling cylindrical body 2 is formed such that the tapered cylindrical periphery t is gradually decreased as in a direction from the inlet opening 3 to the outlet opening 4, a flow velocity of the treated hot exhaust gas with reduced volume is kept almost the same velocity without much varying from a flow velocity of the hot gas introduced from the inlet opening 3 of the rapid cooling cylindrical body 2. The exhaust gas is passed through the rapid cooling cylindrical body 2, and then discharged as cooled gas with a desired temperature from the outlet opening 4 formed at the lower portion of the cylindrical body.

In order to cool hot gas rapidly and effectively, the higher a temperature difference between the coolant and the hot gas is set, the better the cooling effect is. Therefore in the present embodiment, inlet openings of the cooling air are mutually arranged at opposite sides of neighboring planar cooling blocks comprising planar cooling tube groups a, a, . . . , so that temperature differences between the hot gas and contact surfaces of cooling tubes 5 can set as high as possible, thus the hot gas is rapidly cooled.

Particularly, when the hot gas is exhaust gas having components which are re-synthesized into dioxins during a cooling stage, the hot gas should be cooled rapidly from a temperature higher than dioxin decomposing temperature, namely, 800° C.~900° C. to a temperature lower than the dioxin re-synthesizing temperature, 300°, namely, 200° C.~250° C. in a quite brief time less than 16 thousandths second.

When a temperature of introducing exhaust gas is set 900° C. and a temperature of discharged gas is lowered to 200° C. expanded rates of hot gas at respective temperatures from a base temperature 0° C. at portions of the rapid cooling cylindrical body 2 from the top to the bottom are calculated as follows.

expanded rate at 900° C. (273+900)/273=4.296 expanded rate at 800° C. (273+800)/273=3.930 expanded rate at 700° C. (273+700)/273=3.564 and so on n) expanded rate at 200° C. (273+200)/273=1.732

In conclusion, since hot exhaust gas is contracting its volume as its temperature is dropping, the tapered cylindrical periphery t may be formed around the rapid cooling cylindrical body 2 based on the above calculations.

When exhaust gas with its flow velocity of 20 m/sec is cooled from 900° C. to 200°, the following calculated result is obtained.

$$20\ m/sec \times 16/1000\ sec = 0.32\ m.$$

Namely, it is concluded that a passing distance of the exhaust gas corresponding to a height of the rapid cooling cylindrical body 2 should be set 0.32 m=32 cm.

Figure 5:
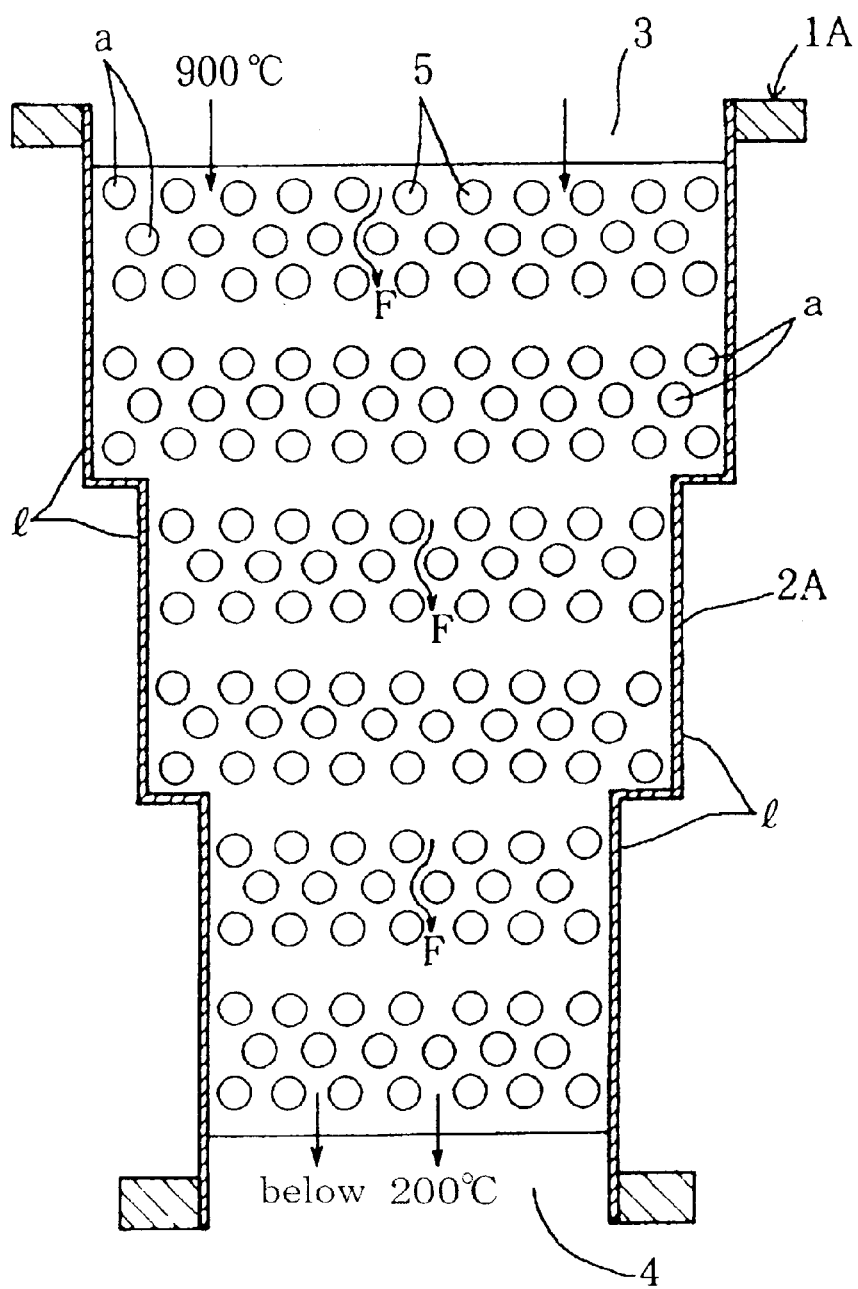
FIG. 5 is a longitudinal sectional view of a main arrangement of another embodiment by the present invention.

Hereinafter another embodied exhaust gas raid cooling apparatus 1A by the present invention is explained by referring to FIG. 5.

In this embodiment, the tapered cylindrical periphery t of the rapid cooling cylindrical body 2 of the previous embodiment is modified into a step structure 1. A rapid cooling cylindrical body 2A is obtained when the rapid cooling cylindrical body 2 is modified such that its cross sectional volume reduces stepwise in a direction from the top to the bottom of the cylindrical body. As a result the exhaust gas can pass the cooling apparatus in a short time as a flow velocity being kept at the initial value without reducing the flow velocity due to volume contraction by heat exchange of the hot exhaust gas, in the same manner as the previous embodiment.

Since arrangement of cooling tubes 5, introducing and discharging methods of coolant and the like are same as the previous embodiment, the same reference numerals are used and further explanation is omitted.

Figure 6:
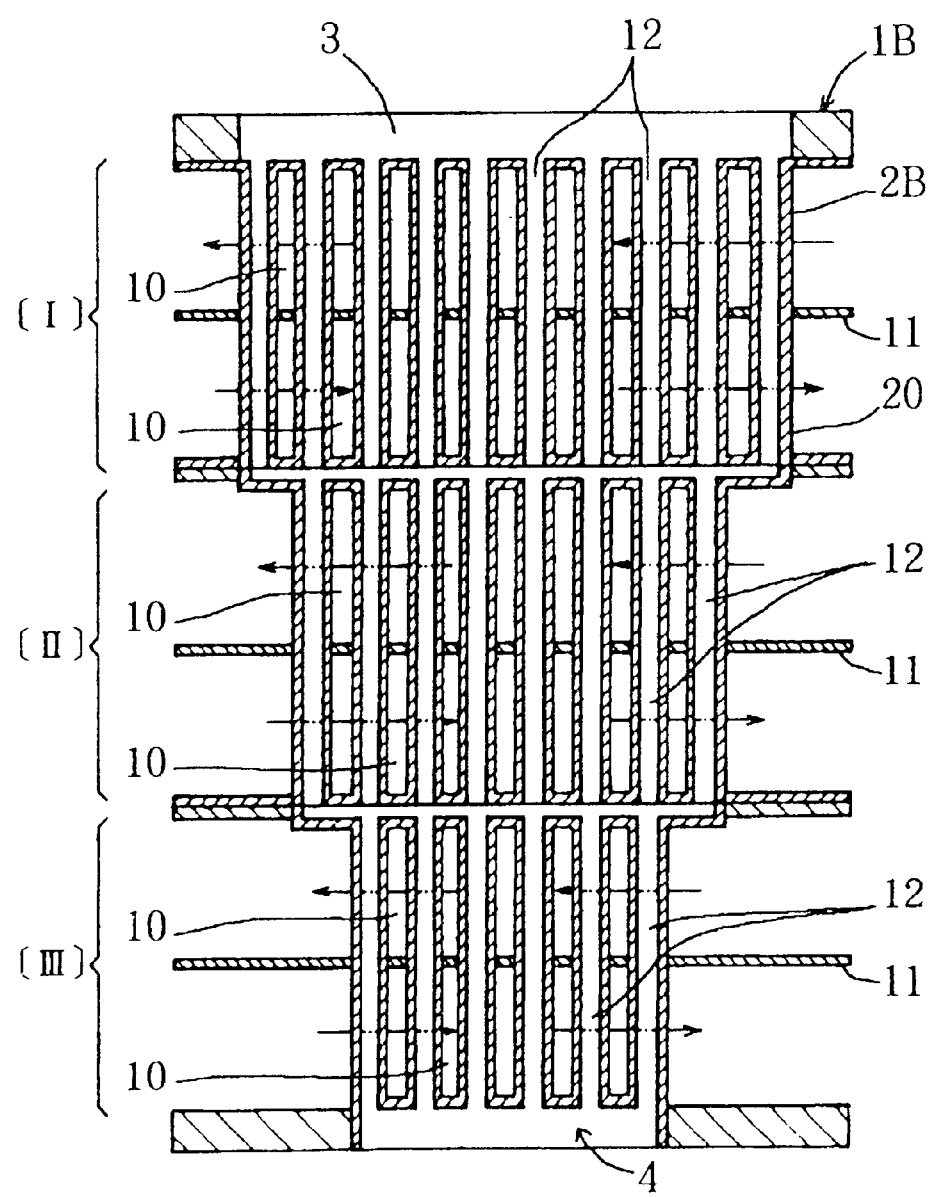
FIG. 6 is a cross-sectional view along VI—VI line in FIG. 7, illustrating a main arrangement of other embodiment by the present invention.
Figure 7:
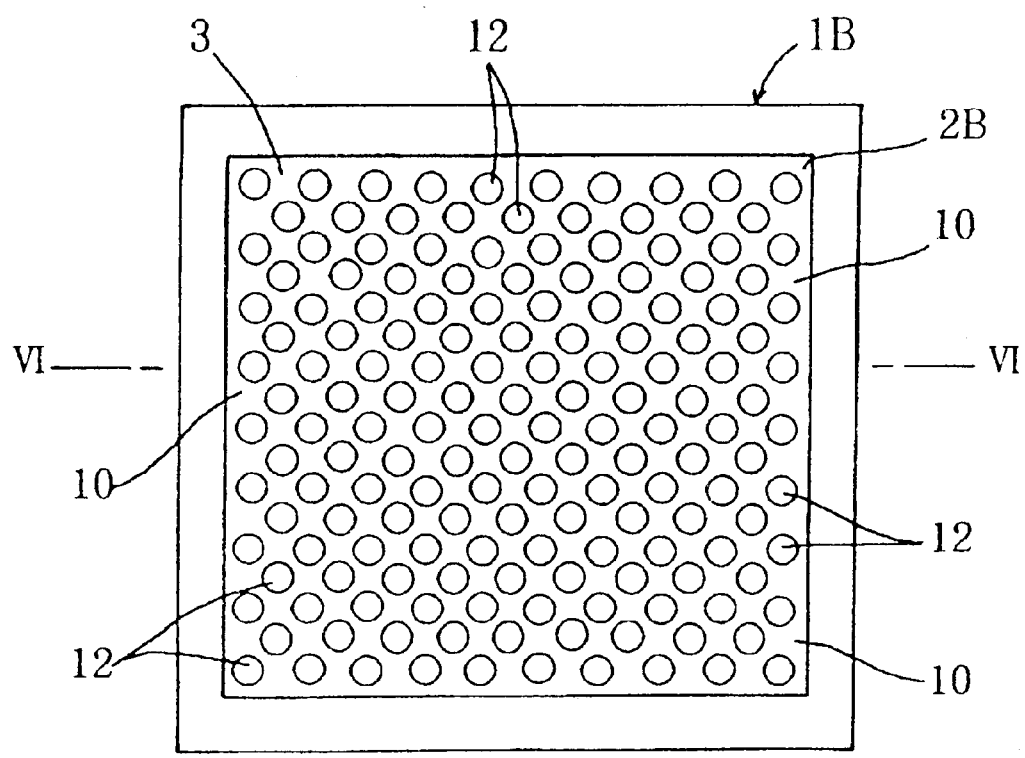
FIG. 7 is a plan view for explaining the arrangement in FIG. 6.

Further, other embodiment is explained by referring to FIGS. 6 and 7.

This embodiment has the following different arrangements from the preceding two embodiments. Hot exhaust gas is introduced and divide into a plurality of flow tubes 12 longitudinally arranged by small spacing each other in a rapid cooling cylindrical body 2B of a rapid cooling apparatus 1B. While cooling gas passes through multistage compartments 10, 10 . . . from both sides of the rapid cooling cylindrical body 2B to the opposite sides each other as shown by arrows in FIG. 6.

The arranged number of flow tubes 12 is being reduced gradually downward so as to meet a volume nearly corresponding to contracted volume of the exhaust gas. In other words as shown in the drawings, a flow path of the exhaust gas is reduced its width stepwise so that a discharging flow velocity of the exhaust gas is kept almost at the same value as an introducing velocity of the exhaust gas, thus the exhaust gas can be cooled to below the dioxin re-synthesizing temperature in a brief time, namely, within 16 thousandths second and can be discharged.

As materials for the flow tubes 12, preferably zirconium and tantalum are used in the uppermost stage (I) where the temperature of the exhaust gas is the highest, titanium is used in a middle stage (II) where the temperature is gradually dropped and Inconel alloy (Japanese Industrial Standard: SUS316) is used in the lowermost stage, taking resistant and anticorrosion effects of the rapid cooling apparatus into consideration.

Since inlet opening and outlet openings of the exhaust gas of the present embodiment are the same as the preceding embodiments, the same reference characters are assigned. A reference numeral "11" is walls dividing compartments 10, 10.

As described above, cooling air is used in these embodiments as the coolant, liquid such as water and the like are also employed instead.

Although not illustrated in the drawings, when exhaust gas which contains dioxins is at a relatively low temperature lower than 700° C.~800° C. where dioxins are not completely decomposed, the exhaust gas should be heated again so as to decompose dioxins completely, and when mist is suspended in the exhaust gas, the exhaust gas should be passed through a high temperature multi-cyclone so as to remove the suspended mist and keep its temperature over 800°. Then heated exhaust gas is introduced to inlet openings 3 of the above-described rapid cooling cylindrical bodies 2, 2A and 2B.

POSSIBILITY OF INDUSTRIAL USE

Since the apparatus by the present invention can rapidly cool hot exhaust gas such as waste gas discharged from various furnaces, it can be built in not only combustion equipment but also melting furnaces in plants. And it can be compactly and easily built in existing or newly constructing combustion systems, since it can suppress a quantity of re-synthesized dioxins almost completely below 0.1 ng-TEQ/m$^3$N, a criterion value of re-synthesized dioxins which said to be generated in various incinerators used for waste treatment. The value is set for waste incinerators with capacities more than 4 ton/hour by the Japanese government.

Since the rapid cooling apparatus by the present invention has a simple arrangement, it can be used in various cooling apparatuses in addition to the cooling apparatus for hot exhaust gas. Further, it is suited to construct at an inexpensive cost and to mass-produce.

What is claimed is:

1. A rapid cooling method for exchanging heat between hot exhaust gas and coolant via tubes when the hot exhaust gas passes at a desired flow velocity, comprising:

reducing the value of the cross sectional area of a rapid cooling cylindrical body in accordance with a reducing volume of the exhaust gas as the gas temperature is drops in a flow direction through the body so as to keep the initial flow velocity of the gas while cooling the exhaust gas to a desired temperature;

said hot exhaust gas including dioxins discharged from an incinerator in a decomposed state, being cooled to below a dioxin re-synthesizing temperature within 16 thousandths second.

2. A rapid cooling method for exchanging heat by passing and dividing hot exhaust gas through a plurality of flow tubes arranged in a rapid cooling cylindrical body so as to cross a flow direction of the coolant, wherein:

the number of said plurality of flow tubes is reduced in a flow direction of the exhaust gas so as to keep a flow velocity of heat exchanged and cooled exhaust gas at almost same as a flow velocity of an inlet side;

said hot gas which includes dioxins discharged from an incinerator in a decomposed state, is cooled to below a dioxin re-synthesizing temperature within 16 thousandths second.

3. The rapid cooling method of claim 1 wherein a cross sectional area of said rapid cooling cylindrical body is gradually reducing in a passing direction of said hot exhaust gas.

4. The rapid cooling method of claim 3 wherein the cross sectional area of said rapid cooling cylindrical body is reduced as smoothly as possible.

5. The rapid cooling method of claim 3 wherein the cross sectional area of said rapid cooling cylindrical body is reduced stepwise.

* * * * *